United States Patent
Maino

(10) Patent No.: US 7,048,662 B2
(45) Date of Patent: May 23, 2006

(54) HYDRAULIC TENSIONER OF THE HOLLOW PISTON TYPE WITH A SCREW-TYPE RETAINING DEVICE

(75) Inventor: Bruno Maino, Monza (IT)

(73) Assignee: Morse TEC Europe S.r.l., Acore (IT)

(*) Notice: Subject to any disclaimer, the term of this patent is extended or adjusted under 35 U.S.C. 154(b) by 101 days.

(21) Appl. No.: 10/338,400

(22) Filed: Jan. 8, 2003

(65) Prior Publication Data

US 2003/0171178 A1 Sep. 11, 2003

(30) Foreign Application Priority Data

Mar. 7, 2002 (EP) .................................. 02425131

(51) Int. Cl.
*F16H 7/08* (2006.01)
*F16H 7/22* (2006.01)

(52) U.S. Cl. ...................................... 474/110; 474/109

(58) Field of Classification Search ................ 474/110, 474/111, 140, 109, 101
See application file for complete search history.

(56) References Cited

U.S. PATENT DOCUMENTS

| 4,983,144 A | 1/1991 | Ojima | 474/111 |
| 5,004,448 A | 4/1991 | Ojima | 474/111 |
| 5,346,436 A | 9/1994 | Hunter et al. | 474/110 |
| 5,700,215 A | 12/1997 | Tada et al. | 474/110 |
| 5,967,921 A * | 10/1999 | Simpson et al. | 474/110 |
| 5,993,341 A * | 11/1999 | Anderson | 474/110 |
| 6,609,987 B1 * | 8/2003 | Beardmore | 474/111 |

FOREIGN PATENT DOCUMENTS

| EP | 1188955 A1 | 3/2002 |
| GB | 1182999 | 3/1970 |
| JP | 53146064 | 12/1978 |
| JP | 08093867 | 4/1996 |
| JP | 08152051 | 6/1996 |
| JP | 09079330 | 3/1997 |

* cited by examiner

*Primary Examiner*—Marcus Charles
(74) *Attorney, Agent, or Firm*—Brown & Michaels, PC; Greg Dziegielewski

(57) ABSTRACT

A cartridge tensioner (10) for drive transmission belts and chains comprises a cylinder (12) with a cylinder bore, a piston (14) slidably received in the cylinder bore and provided with a piston bore (40), a vent device (16) housed in the piston bore and comprising an end part and a stem integral with each other, a pressure spring (18) acting between a shoulder of the cylinder and the vent device, and a retaining device (20), accessible from the outside of the cylinder. The retaining device, in a position engaged with the stem of the vent device, retains the vent device preventing the action of the spring on the piston, and, in a position of disengagement from the stem of the vent device, allows the spring to bias the device against the piston and to act consequently on the piston.

9 Claims, 3 Drawing Sheets

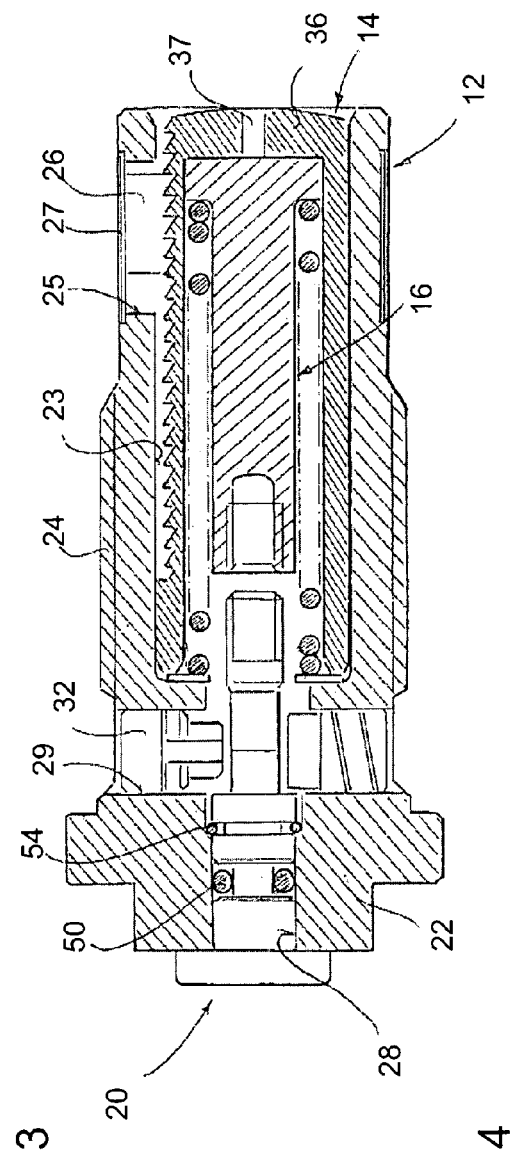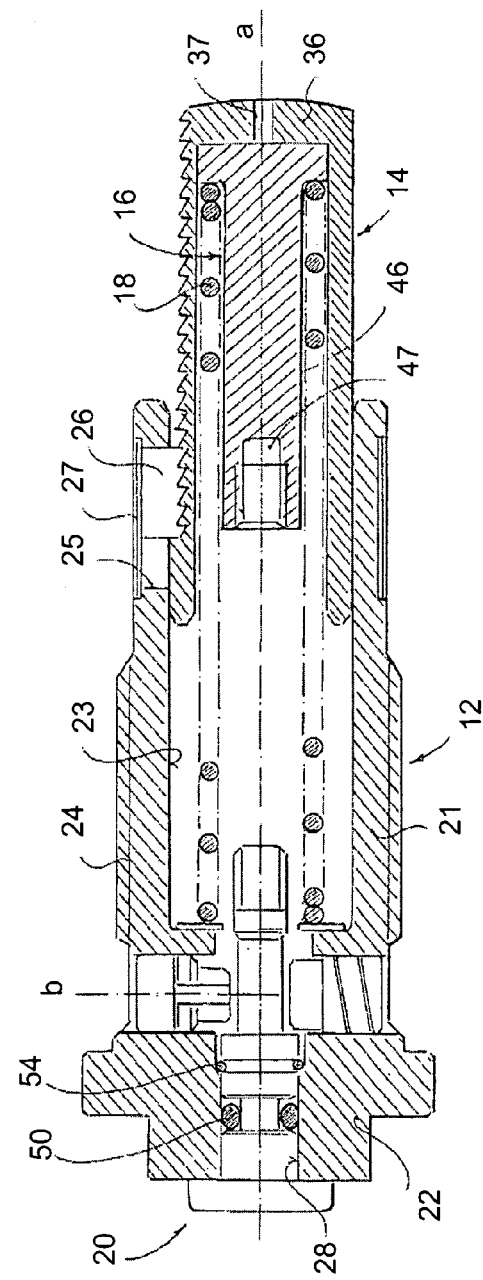
FIG. 3
FIG. 4

HYDRAULIC TENSIONER OF THE HOLLOW PISTON TYPE WITH A SCREW-TYPE RETAINING DEVICE

REFERENCE TO RELATED APPLICATIONS

This application claims an invention which was disclosed in EPC application number 02425131.6, filed Mar. 7, 2002, entitled "HYDRAULIC TENSIONER OF THE HOLLOW PISTON TYPE WITH A SCREW-TYPE RETAINING DEVICE". The benefit under 35 USC§119(a) of the EPC application is hereby claimed, and the aforementioned application is hereby incorporated herein by reference.

BACKGROUND OF THE INVENTION

1. Field of the Invention

The invention pertains to the field of devices for tensioning flexible drive transmission means, such as belts or chains. More particularly, the invention pertains to hydraulic tensioners. Reference will be made to transmission chains for internal combustion engines, such as are used to transmit motion from a first driving sprocket, operated directly or not by a vehicle engine, to one or more driven shafts, for example a cam shaft, fuel injection pump, or oil pump.

2. Description of Related Art

For reasons of adjustment, wear on materials and take-up of slack, it is often necessary to compensate for a certain slack of the chain and this is done by means of shoe tensioners, in which a shoe is biased with adjustable force against a chain side.

The bias on the shoe is normally obtained by a hydraulic tensioner. In its most widely known embodiment, a hydraulic tensioner comprises a cylinder-piston assembly. A stationary member (generally the cylinder) is mounted on the engine block, and a movable member (generally the piston) acts on the shoe under the action of a spring and hydraulic fluid, generally oil. In some known tensioners the piston is hollow and the piston chamber or bore receives a vent device sliding axially therein. The vent device has an end part that can be hemispherical or flat with a thin spiral groove on the face thereof facing toward the bottom of the piston, and the bottom of the piston has a through hole. The device is biased by the spring against the bottom of the piston and allows any air to exit or possibly oil to be discharged for lubrication purposes and to adjust the elastic-damping characteristics of the tensioner. The spring therefore acts between the cylinder and the disk and, through it, acts on the piston.

Some tensioners include a so-called "no-return" device, able to prevent re-entry of the piston into the cylinder if the oil pressure is lost and the action of the spring is not sufficient to maintain the piston in the correct position. The no-return device generally consists of a rack or toothed portion integral with the piston or in any case with the mobile member, which is engaged by a spring-biased toothed or ratchet locking pad.

Tensioners that can be fitted from the outside in the engine block or head, without any need to open the engine are called "cartridge" tensioners. EP-A-00830616.9, not yet published, describes a cartridge tensioner in which the rack portion is formed on the piston skirt. The ratchet pad is received in an opening in the cylinder skirt, with the possibility of axial sliding, and biased against the piston by a circular elastic band. For storage and shipping, before installation the piston is retained in a retracted position, in which only a small portion thereof extends from the cylinder, by engagement of a snap ring or circlip with an inside annular recess of the cylinder and an outside annular recess of the piston. To install the tensioner, it is necessary first to apply a force to the piston head which retracts it inside the cylinder for a length sufficient to move the retaining snap ring into a second, wider internal annular recess of the cylinder, so that the ring releases the piston. Although the solution provided in the aforementioned application is satisfactory for many applications, it nevertheless is not suitable in those situations where it is not possible or easy to apply the retraction force to the piston head.

U.S. Pat. No. 5,700,215 discloses a hydraulic tensioner having a cylinder and a solid piston or plunger movable inside the cylinder, in which a stopper screw for the piston is rotatably received in a through aperture of the cylinder wall and an internally threaded recess is formed on the inner end face of the piston. The screw, when engaged in the recess of the piston, retains the piston in a retracted condition, as can be required, for example, for maintenance purposes. This patent does not solve the problem concerning hollow piston or cartridge tensioners.

SUMMARY OF THE INVENTION

A cartridge tensioner for drive transmission belts and chains comprises a cylinder with a cylinder bore, a piston slidably received in the cylinder bore and provided with a piston bore, a vent device housed in the piston bore and comprising an end part and a stem integral with each other, a pressure spring acting between a shoulder of the cylinder and the vent device, and a retaining device, accessible from the outside of the cylinder. When the retaining device is in a position engaged with the stem of the vent device, it retains the vent device, and prevents the action of the spring on the piston. When the retaining device is in a position of disengagement from the stem of the vent device, it allows the spring to bias the device against the piston and to act consequently on the piston. In a preferred embodiment, the end part is disc-shaped or convex.

BRIEF DESCRIPTION OF THE DRAWINGS

FIG. 3 shows an axial sectional view of the tensioner of FIG. 2, wherein the tensioner is illustrated in an operative condition, with the retaining screw disengaged from the. stem, and with the piston in a retracted position inside the cylinder.

FIG. 4 shows an axial sectional view of the tensioner of FIGS. 2 and 3, in an operative condition with the piston at its maximum extension.

DETAILED DESCRIPTION OF THE INVENTION

The present invention shows a cartridge tensioner with a retaining device, which can be applied in those situations where it is not possible or easy to apply an initial retracting force to the piston head.

The tensioner of the present invention includes a cylinder, a retaining valve for the hydraulic fluid in the cylinder, a hollow piston movable inside the cylinder and having a piston bore, a vent device inside the piston bore, a pressure spring between the cylinder and the vent device, and a retaining device, preferably a stopper or retaining screw, rotatably received in the cylinder and in screwing engagement with a stem part of the vent device. The retaining screw is preferably disposed coaxially to the cylinder and is accessible from the opposite end thereof to that from which the piston protrudes.

When the retaining screw is screwed completely into the stem, the disc is retained in a retracted position in which the spring cannot act on the piston. When the screw is disengaged from the stem, the spring biases the disc against the piston head, and thus acts on the piston, and the device operates in the traditional manner. The tensioner is preferably of the type comprising a longitudinal toothed portion of the piston and a ratchet retaining element or pad spring biased in engagement with the toothed portion or rack of the piston.

The retaining device of the invention acts only on the spring, leaving the piston exposed to other forces. However, friction between the piston rack and the ratchet pad, if provided, when the spring action is eliminated, is generally sufficient to retain the piston. If necessary, moreover, an engagement or interference between the piston bore and the vent device can be foreseen, to retain the piston.

Figure 1:
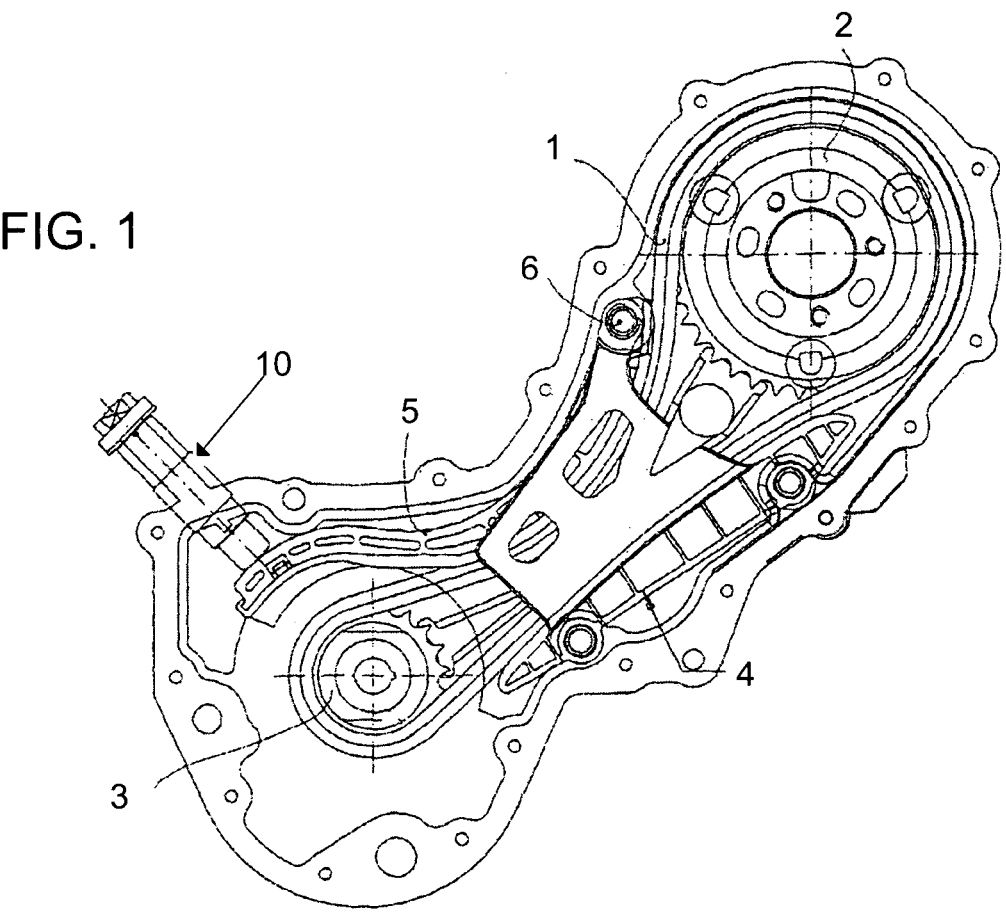
FIG. 1 shows a diagrammatic illustration of a chain transmission provided with a cartridge tensioner.

Now referring to FIG. 1, a chain (1) is shown therein, which is wound on a driving sprocket (2) and a driven sprocket (3). The taut side (the lower one in the figure) is guided by a guide (4). A tensioner shoe (5) acts on the slack side (the upper one in the figure). The shoe (5) is mounted to oscillate around a pivot (6) and is biased against the chain by tensioning device (10).

Figure 2:
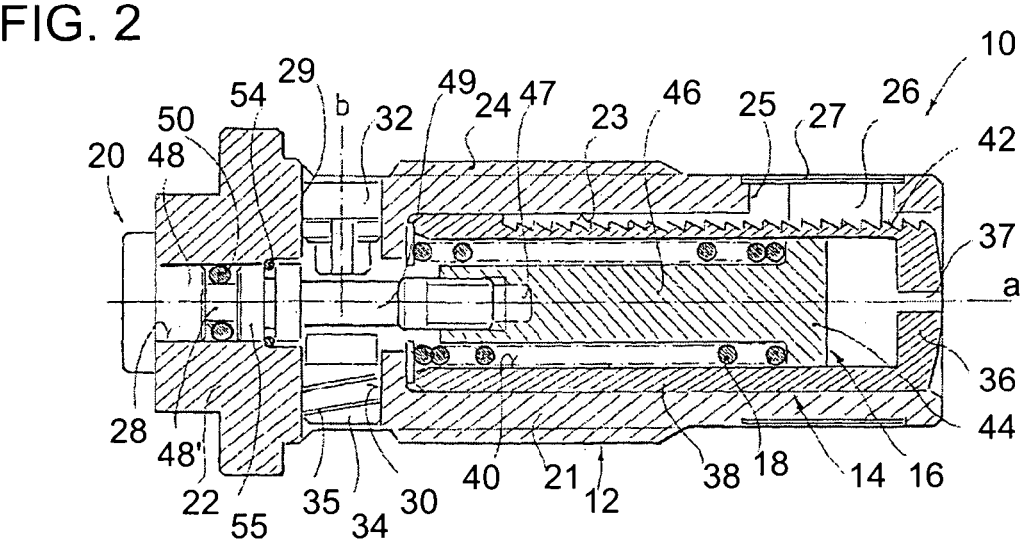
FIG. 2 shows an axial sectional view of a cartridge tensioner according to the invention, in a retracted or rest position, with its retaining screw engaged in the stem.

Referring also to FIGS. 2 through 4, the tensioner (10) of the present invention comprises a cylinder (12), a piston (14), a vent device (16), a spring (18) and a retaining device (20). The cylinder (12) includes a cylinder skirt (21), a cylinder head (22), and a cylinder bore (23). An outer thread (24) on the skirt screws the cartridge tensioner into position in the engine block. The skirt is interrupted by a through aperture (25) which receives a toothed or ratchet pad (26), preferably of the type described in application EP-A-0083066.9, biased elastically toward the axis of the cylinder by an elastic band (27).

The cylinder head (22) has a passage (28) coaxial with the bore (23) and in communication therewith, open toward the outside. Two housings (29) and (30) disposed with their axis (b) transversal to the axis (a) of the cylinder bore (23) receive a check valve (32) and a spiral pin (34), respectively. The valve (32) is preferably of a known type and therefore will not be described in detail. The pin (34), also of a known type, has a thin spiral groove (35) on a cylindrical surface thereof and is used to allow the passage of air during start-up of the device. The pin (34) also allows a controlled loss of oil, to define the dynamic elast-dampening characteristics of the tensioner.

The piston (14) is hollow, has a piston bottom (36) with a central through hole (37) in a known manner, and a piston skirt (38) which defines a piston bore (40) on the inside. The piston skirt has a rack toothing (42) which cooperates with the toothing of the ratchet pad (26) in a known manner, to allow an extension movement of the piston from the cylinder bore (23) and to prevent a return movement of the piston inside the cylinder bore.

The piston bore houses the vent device (16), which includes a end part (44) that controls passage of air, and a stem (46), integral therewith. The end part (44) is preferably disc-shaped or convex (for example hemispherical). The stem of the device has, at the opposite end to the disc, a threaded axial hole, or recess (47).

The pressure spring (18) extends between a face of the vent device (44) and a bottom wall (13) of the cylinder bore (23).

The retaining device or screw (20) comprises a head (48) and an integral threaded stem (49). The head (48) is received in the passage (28) so as to be able to rotate therein around the axis (a). The head (48) has a neck (48') that defines a seat for an O-ring type liquid seal ring (50). A snap ring (54) is received in a circumferential groove of the screw device (20) to retain the screw axially in one direction against a shoulder of the cylinder head. In the opposite direction, the screw is retained because the check valve (32) and the threaded pin (34) protrude inside the passage (28) for such a distance as not to allow the passage of a flared screw body portion, and because the screw head abuts against the cylinder head.

Operation of the tensioner is now described. The tensioner (10) is shown in a rest or installation condition in FIG. 2. The threaded stem (49) of the screw (20) is screwed into the stem (46), so that the vent member or device (16) is maintained in a constrained retracted position in which it keeps the spring (18) compressed. The piston (14) is subject during handling and installation operations only to the action of its own weight. The elastic band (27) is calibrated so that the friction between the piston teeth (42) and the teeth of the pad (26) can withstand the action. If required, it is possible to combine this action with that of a friction assembling ("driving") of the piston (14) and the disc (44).

By unscrewing the screw (20), which can be done easily by maneuvering a screwdriver from the end of the cylinder illustrated on the left in the figures, the stem member (16) is released from the screw device (20). This condition is shown in FIG. 3. The action of the spring (18) then brings the disc (44) against the bottom (36) of the piston and thereafter the action of the spring is applied to the piston. Consequently, the piston, overcoming the friction, tends to extend out of the cylinder and apply a bias to the tensioning shoe (not shown). The piston is shown in the condition of maximum extension from the cylinder in FIG. 4.

Figure 5:
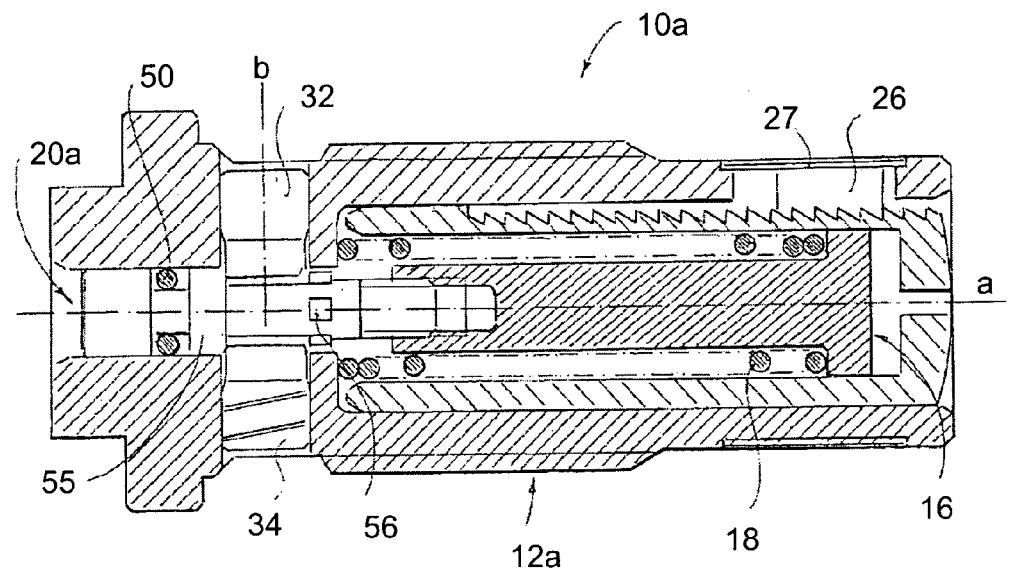
FIG. 5 shows an axial sectional view of another embodiment of the tensioner of the invention, in which the tensioner is illustrated in the rest position.

In an alternative embodiment shown in FIG. 5, the elements corresponding to those of the preceding figures are denoted by the same reference numerals, and will not be further described in detail. The tensioner (10a) of FIG. 5 differs from the tensioner (10) of the preceding figures essentially in that the screw device (20a) is retained axially, not by engagement of the snap ring (54) against a shoulder of the cylinder head passage, but by ridges (56) of the screw shank, and by a widened portion (55) thereof, which engage with inward protruding end parts of check valve (32) and of spiral pin (34). Operation of the device (10a) is similar that of the device (10) and will not be further described.

Figure 6:
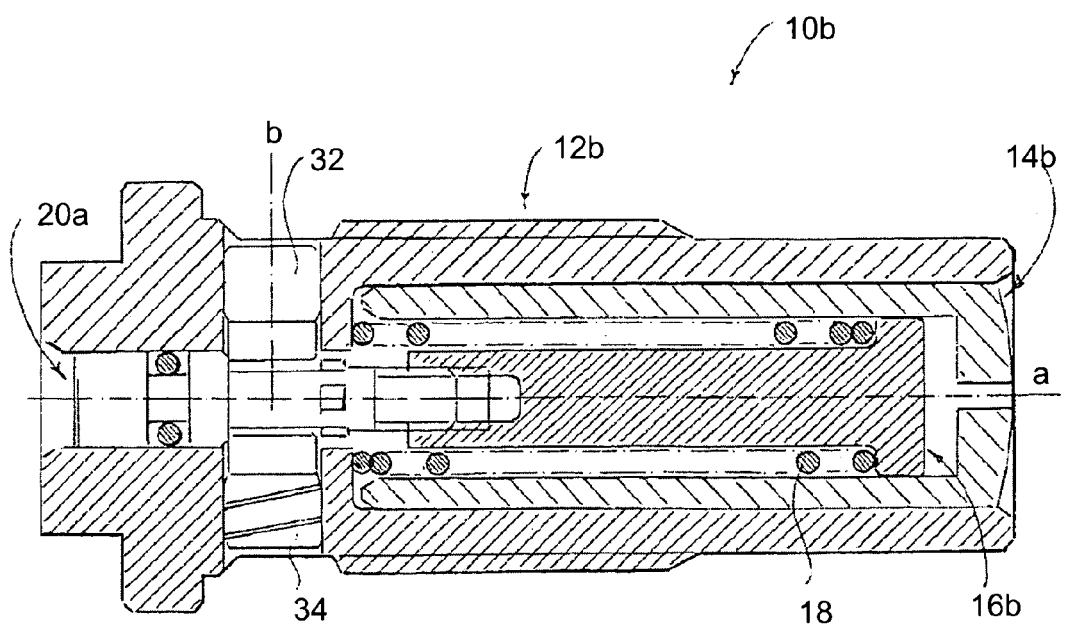
FIG. 6 shows an axial sectional view of another embodiment of the tensioner in a rest condition; the tensioner has no toothing of the piston and no ratchet pad.

FIG. 6 shows an alternative embodiment (10b) of the tensioner in which a retaining screw device (20a) similar to that of FIG. 5 (but it could also be the device (20) of FIGS. 2–4) is applied to the stem of a vent device (16b) that cooperates with a piston (14b) without side toothing. The members of the tensioner (10b) identical to those of the tensioners of the preceding figures are denoted by the same reference numerals and will not be described in detail. The disk (16b) preferably interferes with a portion of the inner surface of the skirt of piston (14*b*) so as to be able during handling and assembly operations to retain the piston when only the action of its own weight and not that of the spring (18) is applied thereto, that is in the rest condition illustrated in FIG. 6.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A cartridge tensioner for transmission belts or chains comprising:
   a) a cylinder comprising a cylinder bore;
   b) a piston slidably received in the cylinder bore and provided with a piston bore;
   c) a vent device slidable in the piston bore, comprising an end part and a stem, wherein the stem extends from the end part;
   d) a pressure spring acting between a shoulder of the cylinder and the end part of the vent device; and
   e) a retaining device for the vent device, accessible from the outside of the cylinder;
   wherein the retaining device is in an engagement position with the stem of the vent device to prevent the pressure spring from acting on the piston; and
   wherein the retaining device is in a disengagement position with the stem of the vent device to allow the pressure spring to bias the vent device against the piston and to act consequently on the piston.

2. The tensioner according to claim 1, wherein:
   a) the retaining device comprises a threaded stem; and
   b) the stem of the vent device comprises a corresponding threaded recess.

3. The tensioner according to claim 1, further comprising:
   a) a check valve for entry of hydraulic fluid into a chamber of the cylinder; and
   b) a spiral pin for controlled discharge of air and/or lubricant;
   wherein the check valve and the spiral pin are disposed with a relative axes (b) transversal to an axis (a) of the chamber of the cylinder.

4. The tensioner according to claim 1, further comprising means for axially retaining the retaining device in position.

5. The tensioner according to claim 4, wherein the retaining means comprise a snap ring.

6. The tensioner according to claim 4, wherein the retaining means comprises: at least one ridge on the retaining device; and at least one protrusion on the check valve and on the spiral pin.

7. The tensioner according to claim 1 further comprising:
   f) a longitudinal toothed portion on the piston; and
   g) a ratchet pad biased elastically into engagement with the toothed portion to allow movement of the piston in only one direction.

8. The tensioner according to claim 1, wherein the end part controls a passage of air.

9. The tensioner according to claim 1, wherein the end part and the stem are integral with each other.

* * * * *